(12) United States Patent
Ohkuma et al.

(10) Patent No.: US 9,007,022 B2
(45) Date of Patent: *Apr. 14, 2015

(54) STATIONARY CHARGING SYSTEM

(71) Applicant: Nichicon Corporation, Kyoto (JP)

(72) Inventors: Shigeo Ohkuma, Kyoto (JP); Takamasa Mitsuya, Kyoto (JP); Shinsuke Tachizaki, Kyoto (JP)

(73) Assignee: Nichicon Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/114,789

(22) PCT Filed: Oct. 1, 2012

(86) PCT No.: PCT/JP2012/075371
§ 371 (c)(1),
(2) Date: Oct. 30, 2013

(87) PCT Pub. No.: WO2013/054680
PCT Pub. Date: Apr. 18, 2013

(65) Prior Publication Data
US 2014/0062403 A1    Mar. 6, 2014

(30) Foreign Application Priority Data
Oct. 11, 2011    (JP) .................. 2011-224054

(51) Int. Cl.
*H02J 7/00* (2006.01)
*H02J 1/10* (2006.01)
*H02J 13/00* (2006.01)
*B60L 11/18* (2006.01)

(52) U.S. Cl.
CPC ............ *H02J 7/0052* (2013.01); *Y02T 10/7005* (2013.01); *Y02T 90/16* (2013.01); *H02J 1/102* (2013.01); *H02J 13/0003* (2013.01); *B60L 11/1816* (2013.01); *B60L 11/1825* (2013.01); *B60L 2230/40* (2013.01)

(58) Field of Classification Search
CPC ......................................................... Y02T 90/163
USPC ......................................................... 320/109
See application file for complete search history.

(56) References Cited

U.S. PATENT DOCUMENTS 6,847,189 B2 *   1/2005   Frank ........................... 320/104
(Continued)

FOREIGN PATENT DOCUMENTS

| JP | 11-113187 | 4/1999 |
| JP | 2001-359243 | 12/2001 |
| JP | 2007-244097 | 9/2007 |

(Continued)

*Primary Examiner* — Yalkew Fantu
(74) *Attorney, Agent, or Firm* — Jordan and Hamburg LLP

(57) ABSTRACT

A stationary charging system that is capable of battery charging even when a charging unit has a fault is mounted in a vehicle and includes a power unit for generating direct-current charging power, a plurality of charging units (CHG1 to CHG9) that constitute the power unit, a control unit (MCU), and a first CAN communication line for allowing data exchange between the control unit the charging units, the charging units create charging unit status data concerning results of fault diagnosis on themselves, and transmit the data to the control unit, and the control unit classifies the charging units into a plurality of charging unit groups 4-1, 4-2, and 4-3, and changes output statuses of the charging units for each of the charging unit groups upon reception of charging unit status data indicative of a fault.

7 Claims, 5 Drawing Sheets

(56) References Cited

U.S. PATENT DOCUMENTS

| | | |
|---|---|---|
| 7,688,074 B2 * | 3/2010 | Cox et al. .................. 324/426 |
| 2004/0060751 A1 * | 4/2004 | Frank ........................ 180/65.2 |
| 2004/0169489 A1 * | 9/2004 | Hobbs ........................ 320/104 |

FOREIGN PATENT DOCUMENTS

| | | |
|---|---|---|
| JP | 2009-095157 | 4/2009 |
| WO | WO-2009/008227 | 1/2009 |
| WO | WO-2001/108439 | 9/2011 |

* cited by examiner

STATIONARY CHARGING SYSTEM

TECHNICAL FIELD

The present invention relates to stationary charging systems for charging batteries mounted in vehicles, particularly to a stationary charging system including a plurality of charging units.

BACKGROUND OF THE INVENTION

In general, approaches for charging a battery with power supplied from outside a vehicle are roughly classified into the approach that uses an in-vehicle charger mounted in a vehicle, and the approach that uses a stationary charging system located at a charging station or suchlike.

In the former of these approaches, the in-vehicle charger is connected to a household electrical outlet, and performs, for example, 100V AC to 200V DC conversion to charge the battery with a charging power of 200V DC at a relatively low speed.

On the other hand, in the latter approach, the stationary charging system performs, for example, 200V AC to 400V DC conversion to rapidly charge the battery with a charging power of 400V DC.

For example, a conventionally known stationary charging system includes a power unit 102, which consists of a single charging unit (CHG) 103, a control unit (MCU) 105 for controlling the charging unit 103, a first CAN communication line 106 for allowing data exchange between the control unit 105 and the charging unit 103, a second CAN communication line 107 for allowing data exchange between the control unit 105 and a vehicle via a charging gun (connector) 109, and an I/F portion 108, which consists of a liquid crystal touch panel for performing the operation of starting charge, etc., as shown in FIG. 7.

In the stationary charging system 100, the charging unit 103, which constitutes the power unit 102, converts alternating-current input power to direct-current charging power to be supplied to the vehicle via the charging gun 109.

Another conventionally known stationary charging system which includes a power unit consisting of a single charging unit is described in, for example, Patent Document 1.

PRIOR ART DOCUMENT

Patent Document

Patent Document 1: Japanese Laid-Open Patent Publication No. 2009-95157

SUMMARY OF THE INVENTION

As described above, the conventional stationary charging system 100 has the power unit 102 consisting of a single charging unit 103, and therefore, when the charging unit 103 has a fault, the charging power that is supplied to the battery changes significantly.

Furthermore, the CHAdeMO standard stipulates that when charging power changes during charging, the charging should be stopped. Therefore, the conventional stationary charging system 100 has a problem in that when the charging unit 103 has a fault, it has to stop charging the battery.

Still further, the conventional stationary charging system 100 has a problem in that the battery charging cannot be resumed until the charging unit 103 is repaired.

The present invention has been made in view of the above circumstances, and a problem thereof is to provide a stationary charging system that is capable of battery charging even when a charging unit has a fault.

To solve the aforementioned problem, the present invention provides a stationary charging system for charging a battery mounted in a vehicle with direct-current charging power generated from alternating-current input power, including:

a power unit for generating the direct-current charging power from the alternating-current input power; a plurality of charging units that constitute the power unit; a control unit for controlling the charging units; and a CAN communication line for allowing data exchange between the control unit and the charging units, in which, the direct-current charging power is a sum of output power provided by the charging units, the charging units conduct fault diagnosis on themselves to create charging unit status data concerning results of the fault diagnosis, and transmit the charging unit status data to the control unit, and the control unit classifies the charging units into a plurality of charging unit groups, and changes output statuses of the charging units for each of the charging unit groups upon reception of the charging unit status data indicative of a fault.

Here, in the stationary charging system, the alternating-current input power is three-phase alternating-current power, and the charging unit groups each consist of any three of the charging units to which an arbitrary one of the three phases of the alternating-current power is inputted.

In this configuration, the power unit consists of a plurality of charging units, and therefore, even if any of the charging units has a fault, battery charging can be performed.

Furthermore, with this configuration, upon reception of charging unit status data indicative of a fault, the output statuses of the charging units are changed per charging unit group, and therefore, for example, when there is a fault in one of the three charging units that constitute the same charging unit group, outputs from the two other charging units without a fault are changed in accordance with the status of the charging unit with the fault, so that the output voltage does not vary among the three charging units.

Note that the term "output status" as used herein encompasses not only the states of "halt in output" and "outputting" but also the status of the charging unit providing an output multiplied by the correction coefficient x. Accordingly, in the case where the "output statuses" are changed per charging unit group, all of the charging units that constitute the same charging unit group are set to the state of "halt in output" or to the state of "outputting" with the same correction coefficient x.

Furthermore, the "correction coefficient x" is adapted to increase or decrease the output current value of the charging unit in order to maintain the rated power value for charging power at the time of a fault, and it is set at its default value, such that x=1, while the charging unit is in normal operation.

In the stationary charging system, when the charging unit status data indicative of a fault is transmitted, (1) the control unit may stop the charging units that constitute the charging unit group including the charging unit diagnosed with the fault, as well as the charging units that constitute the other charging unit groups, thereby stopping battery charging, and the control unit may cause the charging units that constitute the other charging unit groups to perform the subsequent charging.

Furthermore, (2) the control unit may stop the charging units that constitute the charging unit group including the charging unit diagnosed with the fault, and may also increase output power of the charging units that constitute the other charging unit groups in order to maintain a rated power value for the direct-current charging power, thereby continuing battery charging.

Furthermore, (3) the control unit may reduce output power of the charging units that constitute the charging unit group including the charging unit diagnosed with the fault, at the same rate, and may also increase output power of the charging units that constitute the other charging unit groups in order to maintain a rated power value for the direct-current charging power, thereby continuing battery charging.

In the case of (2) or (3) above, the control unit preferably causes the charging units that constitute the other charging unit groups to perform the subsequent charging at a lower power value than at the rated power value.

Furthermore, in the stationary charging system, preferably, the charging unit receives command data transmitted from the control unit and conducts the fault diagnosis, and the control unit transmits the command data to at least one of the charging unit groups and the rest of the charging unit groups at different times, so that the charging unit status data is received at varying times.

With this configuration, the control unit receives the charging unit status data at different times, so that the number of items of charging unit status data to be received by the control unit at one time can be reduced, and therefore, the control unit can reliably receive data from the charging units.

The present invention makes it possible to provide a stationary charging system that is capable of battery charging even when a charging unit has a fault.

DETAILED DESCRIPTION OF THE PREFERRED EMBODIMENTS

Hereinafter, a preferred embodiment of a stationary charging system according to the present invention will be described with reference to the accompanying drawings.
[Configuration of Stationary Charging System]

Figure 1:
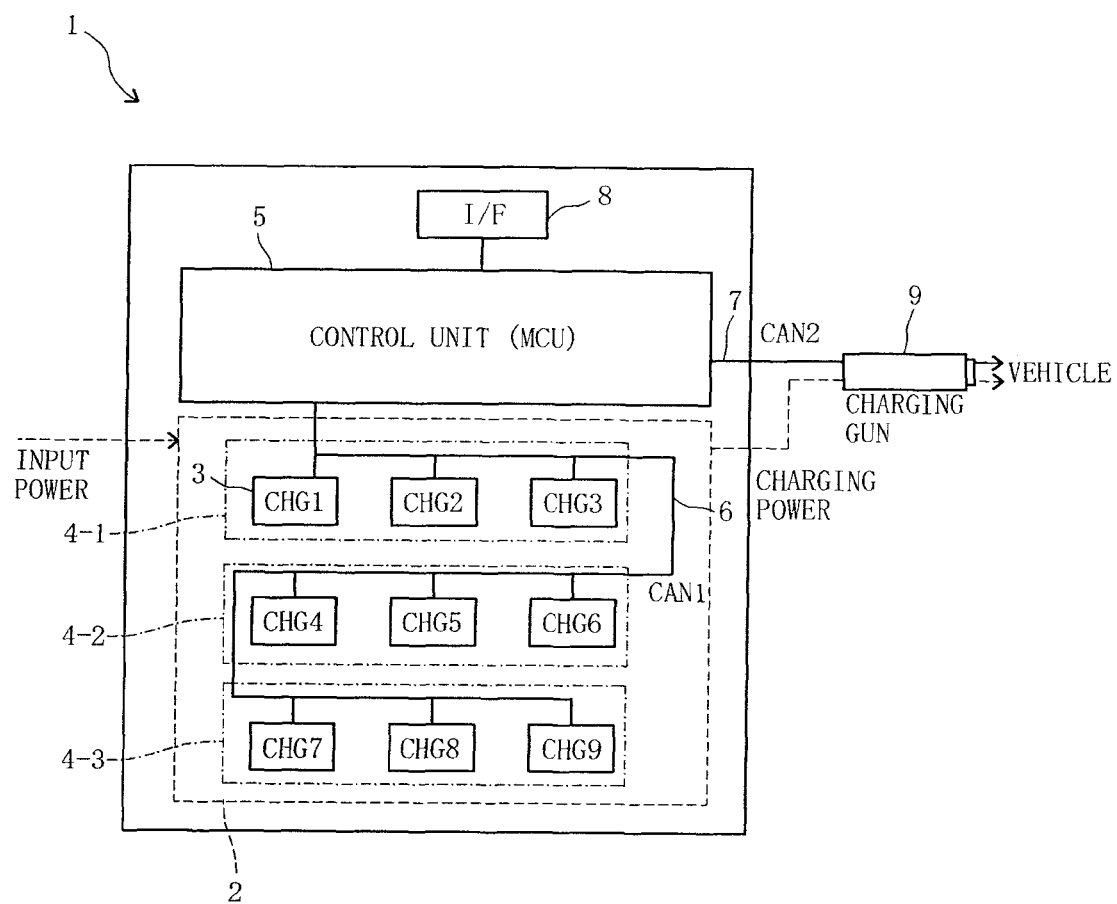
FIG. 1 is a block diagram of a stationary charging system according to the present invention.

FIG. 1 provides a block diagram of a stationary charging system 1 according to an embodiment of the present invention.

As shown in the figure, the stationary charging system 1 includes a power unit 2 consisting of a plurality (in the present embodiment, nine) of charging units 3 (CHG1 to CHG9), a control unit (MCU) 5 for controlling the charging units 3, a first CAN communication line 6 for allowing data exchange between the control unit 5 and the charging units 3, a second CAN communication line 7 for allowing data exchange between the control unit 5 and a vehicle via a charging gun (connector) 9, and an I/F portion 8 consisting of a liquid-crystal touch panel for performing the operation of starting charge, etc.

The charging units 3 are connected in parallel by the first CAN communication line 6, and divided into groups of three: first charging unit group 4-1 (CHG1 to CHG3); second charging unit group 4-2 (CHG4 to CHG6); and third charging unit group 4-3 (CHG7 to CHG9).

Input power supplied to the power unit 2 is three-phase alternating-current power, and any one of the three phases is inputted to the three charging units 3 included in each of the charging unit groups 4-1, 4-2, and 4-3. For example, phases U, V, and W are inputted to 4-1, 4-2, and 4-3, respectively.

Figure 2:
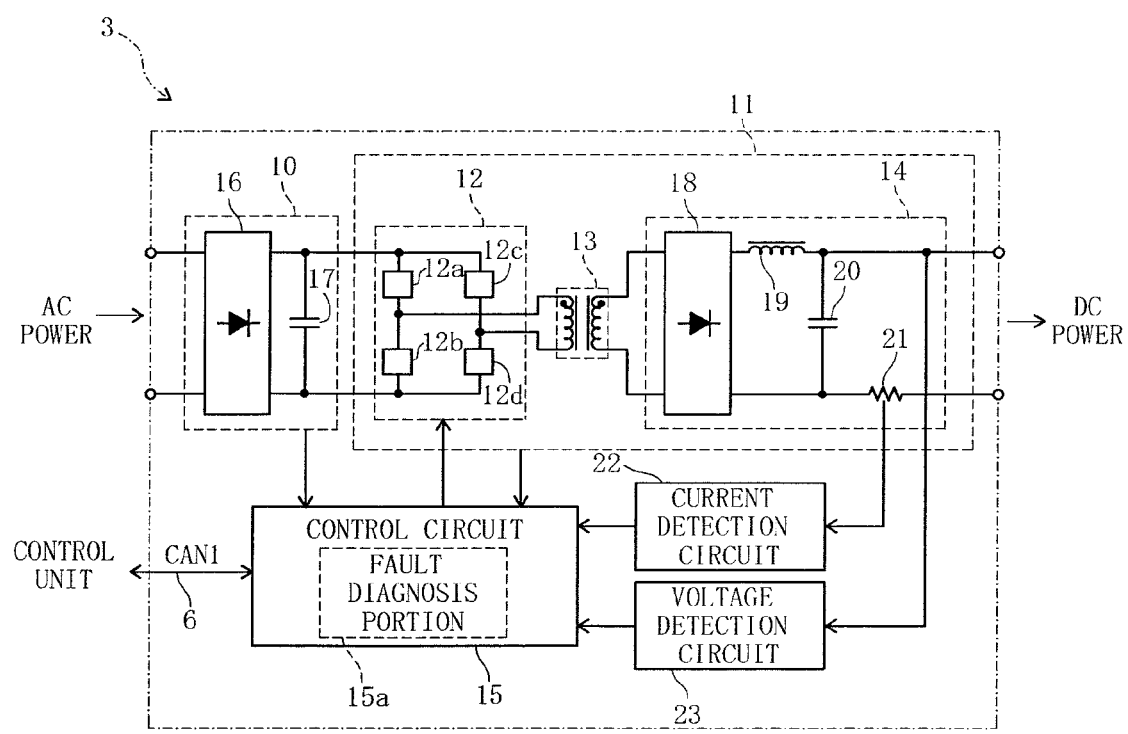
FIG. 2 is a block diagram of a charging unit of the present invention.

FIG. 2 provides a block diagram of the charging unit 3.

As shown in the figure, the charging unit 3 includes a rectifying and smoothing circuit 10 for rectifying and smoothing one of the phases of alternating-current power, thereby generating direct-current power, a DC/DC converter circuit 11 for converting the direct-current power generated by the rectifying and smoothing circuit 10 to direct-current power to be used as charging power, through switching with switching means 12a to 12d, and a control circuit 15 for exchanging data with the control unit 5 via the first CAN communication line 6 and controlling duty cycles of the switching means 12a to 12d.

The rectifying and smoothing circuit 10 includes a diode bridge circuit 16, a smoothing capacitor 17, and an unillustrated power factor correction circuit.

The DC/DC converter circuit 11 includes an inverter circuit 12, which consists of the four switching means 12a to 12d such as IGBTs or MOSFETs, a boost circuit 13, which is a transformer, and an output circuit 14 connected to the secondary terminal of the transformer.

The output circuit 14 includes a diode bridge circuit 18, an LC low-pass filter, which consists of a coil 19 and a smoothing capacitor 20, and a shunt resistance 21 of several mΩ.

Furthermore, the charging unit 3 includes a current detection circuit 22 for detecting direct-current electricity applied to the shunt resistance 21, and a voltage detection circuit 23 for detecting direct-current voltage past the LC low-pass filter.

The control circuit 15 has a fault diagnosis portion 15a for diagnosing faults in the rectifying and smoothing circuit 10 and the DC/DC converter circuit 11, and exchanges data with the control unit 5 via the first CAN communication line 6.

On the basis of, for example, temperatures detected by temperature sensors (not shown) attached to the rectifying and smoothing circuit 10 and the DC/DC converter circuit 11, as well as a current value and a voltage value detected by the current detection circuit 22 and the voltage detection circuit 23, the fault diagnosis portion 15a conducts fault diagnosis as to whether or not there is any fault in the rectifying and smoothing circuit 10 and the DC/DC converter circuit 11, and creates charging unit status data concerning the diagnosis.

The charging unit status data includes fault information (fault code) indicating the presence or absence of a fault, as well as identification information (ID) for the charging unit 3, and information concerning output power of the charging unit 3.

Referring again to FIG. 1, to render the charging units 3 (e.g., CHG1 to CHG3) that constitute the same charging unit group (e.g., 4-1) into the same output status, the control unit 5 changes the output statuses of the charging units 3 (e.g., CHG1 to CHG3) per charging unit group.

Specifically, on the basis of vehicle command data concerning a target charging-current value, which is received from the vehicle via the second CAN communication line 7, and charging unit status data, which is received from the charging unit 3, the control unit 5 creates command data concerning a command value for output current to be outputted by each of the charging units 3 (=a required current value×a correction coefficient x), and transmits the command data to the charging units 3.

Here, the required current value is obtained by dividing the target charging-current value by the total number of charging units (in the present embodiment, nine).

[Data Communication Between Control Unit and Charging Units]

Next, data communication between the control unit 5 and the charging units 3 will be described.

Figure 3:
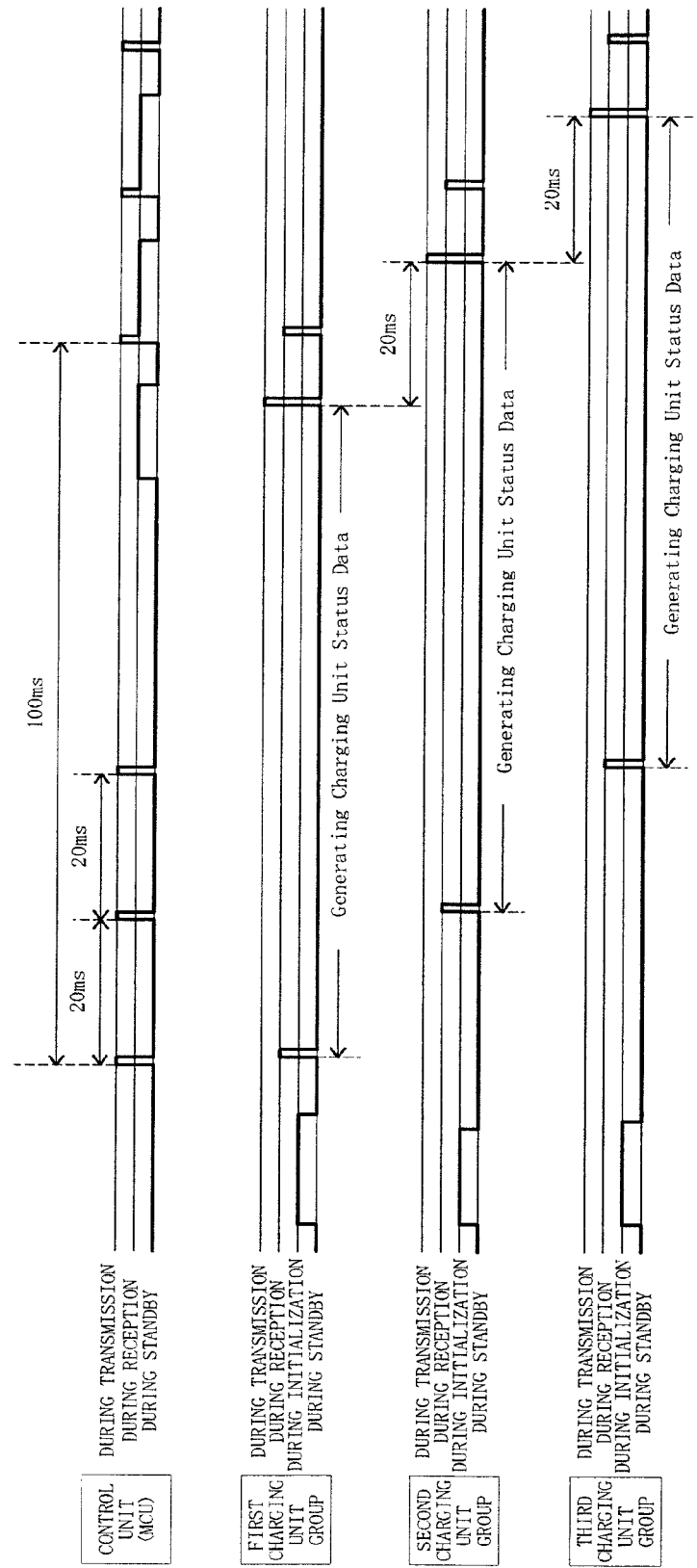
FIG. 3 is a timing chart at the time of activation of the stationary charging system according to the present invention.

FIG. 3 is a timing chart at the time of activation of the stationary charging system 1. As shown in the figure, initially after the main power of the stationary charging system 1 is turned on, so that the control unit 5 and the charging units 3 are activated, the charging units 3 start to be initialized concurrently.

After the initialization of the charging units 3 is complete, the control unit 5 creates command data, which causes the charging units 3 to transmit charging unit status data, and transmits the command data to the charging units 3 via the first CAN communication line 6 at varying times among charging unit groups 4-1, 4-2, and 4-3.

Specifically, the control unit 5 transmits the command data first to the charging units (CHG1 to CHG3) that constitute first charging unit group 4-1, 20 ms later to the charging units (CHG4 to CHG6) that constitute second charging unit group 4-2, and another 20 ms later to the charging units (CHG7 to CHG9) that constitute third charging unit group 4-3.

Upon reception of the command data, the charging units 3 conduct fault diagnosis by their fault diagnosis portions 15a as to whether there is any fault in the rectifying and smoothing circuits 10 and the DC/DC converter circuits 11, and create charging unit status data concerning the results of the fault diagnosis.

The charging unit status data are transmitted in order of creation to the control unit 5 via the first CAN communication line 6.

Specifically, the control unit 5 receives the charging unit status data first from the charging units (CHG1 to CHG3) that constitute first charging unit group 4-1, 20 ms later from the charging units (CHG4 to CHG6) that constitute second charging unit group 4-2, and another 20 ms later from the charging units (CHG7 to CHG9) that constitute third charging unit group 4-3.

Upon reception of the charging unit status data from all of the charging units (CHG1 to CHG9), the control unit 5 calculates a value of charging power (e.g., 30 kW) that can be supplied to the battery, on the basis of the received charging unit status data, and causes the I/F portion 8 to display the charging power value.

Note that the control unit 5 transmits command data to charging unit groups 4-1, 4-2, and 4-3 at varying times, even if it is not the time of activation.

As a result, the stationary charging system 1 according to the present embodiment can prevent the number of pieces of charging unit status data to be received at one time from exceeding the processing capability of the control unit 5, so that charging unit status data can be reliably received in a predetermined communication cycle (e.g., 20 ms) of the first CAN communication line 6.

[Operation of Stationary Charging System at the Time of Fault]

Next, the operation of the stationary charging system 1 at the time of a fault will be described.

Note that First through Third Examples below will be described with respect to the case where a charging unit (CHG5) included in second charging unit group 4-2 transmits charging unit status data indicative of a fault, during charging.

Furthermore, it is assumed that the value of the rated output power for charging unit groups 4-1, 4-2, and 4-3 is 10 kW, the value of the rated charging power outputted by the power unit 2 (the sum of output power) is 30 kW, and for each of the charging units (CHG1 to CHG9), the correction coefficient x is set by default such that x=1.

Still further, it is assumed that, on the basis of vehicle command data concerning a target charging-current value, which is transmitted every 100 ms to the control unit 5 via the second CAN communication line 7, the stationary charging system 1 charges the battery mounted in the vehicle with the aforementioned rated power.

First Example

In this example, when a charging unit (CHG5) transmits charging unit status data indicative of a fault, the control unit 5 stops all charging units (CHG1 to CHG9) from outputting power, thereby stopping battery charging.

Specifically, on the basis of the charging unit status data and the vehicle command data concerning a target charging-current value, the control unit 5 creates command data for setting the value of output power from each of the charging units 3 (CHG1 to CHG9) to zero, i.e., command data for setting the command value for output current to zero, and transmits the command data to the charging unit 3 via the first CAN communication line 6.

As a result, the output status of each of the charging unit 3 that constitute charging unit groups 4-1, 4-2, and 4-3 is set to "halt in output", so that battery charging is stopped.

Furthermore, upon reception of the charging unit status data indicative of a fault, the control unit 5 stores the ID, etc., of the charging unit (CHG5) included in the charging unit status data to memory.

At the beginning of the subsequent charging, the control unit 5 creates command data for setting the output power value of second charging unit group 4-2 to zero, with reference to the memory, and transmits the command data to the charging units (CHG4 to CHG6), and the control unit 5 also creates command data for setting the output power from each of first and third charging unit groups 4-1 and 4-3 to the rated power value (10 kW), and transmits the command data to the charging units (CHG1 to CHG3, and CHG7 to CHG9).

Figure 4:
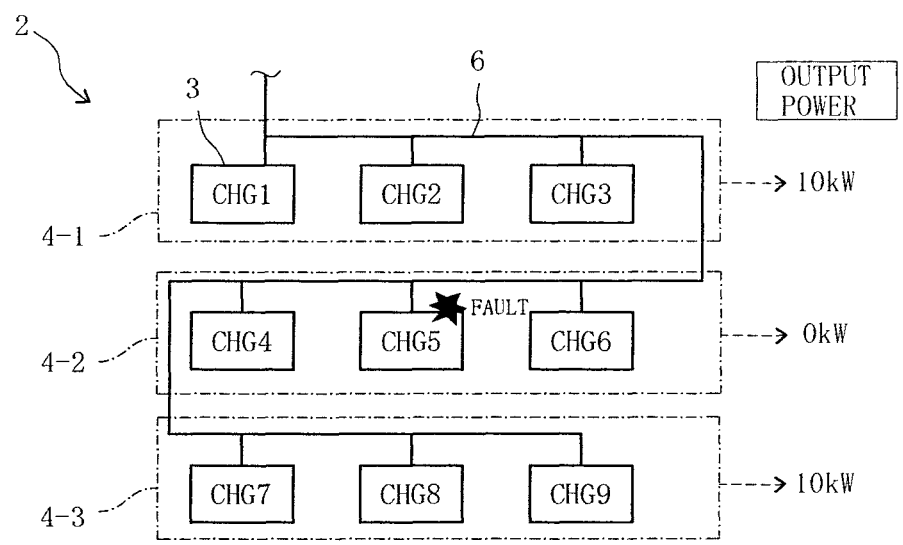
FIG. 4 is a block diagram of a power unit in First Example of the present invention.

That is, even if there is a fault in the charging unit (CHG5), the stationary charging system 1 according to the present example allows the charging units (CHG1 to CHG3, and CHG7 to CHG9) that constitute first and third charging unit groups 4-1 and 4-3 to perform the subsequent charging at a lower power value (20 kW) than at the rated power value (30 kW) (see FIG. 4).

Thereafter, the user is notified of the charging power being set to 20 kW through the I/F portion 8.

Second Example

In this example, when a charging unit (CHG5) transmits charging unit status data indicative of a fault, the control unit 5 stops charging units (CHG4 to CHG6) from outputting power, but the battery charging is continued.

Specifically, on the basis of charging unit status data and vehicle command data, the control unit 5 creates command data for setting the output power value of second charging unit group 4-2 to zero, i.e., command data for setting the command value for output current to zero, and transmits the command data to the charging units (CHG4 to CHG6).

As a result, the output status of each of the charging units (CHG4 to CHG6) that constitute second charging unit group 4-2 is set to "halt in output".

Furthermore, to maintain the rated power value (30 kW) for charging power, the control unit 5 creates command data for changing the correction coefficients x for the charging units (CHG1 to CHG3, and CHG7 to CHG9) that constitute first and third charging unit groups 4-1 and 4-3 from 1 to 1.5, and transmits the command data to the charging units (CHG1 to CHG3, and CHG7 to CHG9).

Figure 5:
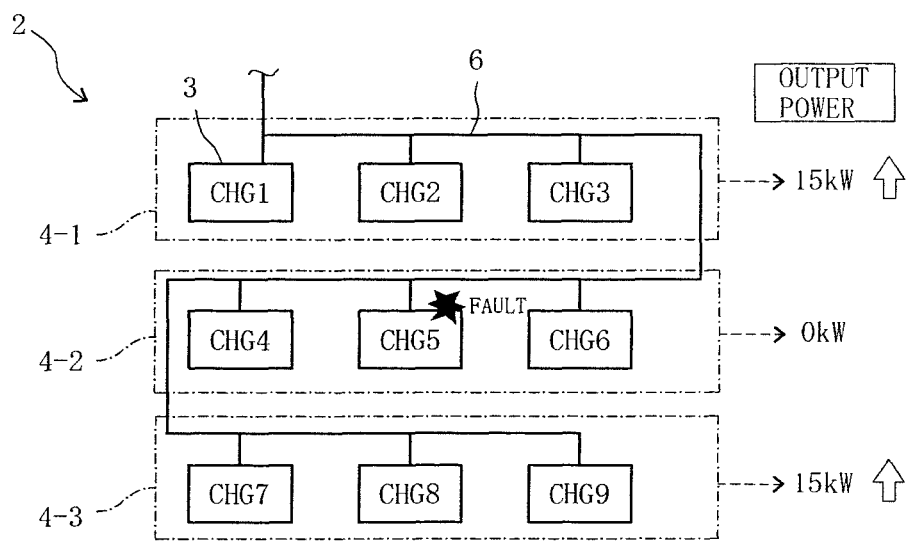
FIG. 5 is a block diagram of a power unit in Second Example of the present invention.

As a result, the output power from each of first and third charging unit groups 4-1 and 4-3 is such that 10 kW×1.5=15 kW, therefore, the rated power value (30 kW) for charging power is maintained, so that battery charging can be continued (see FIG. 5).

Note that at the subsequent charging, to prevent the charging units (CHG1 to CHG3, and CHG7 to CHG9) from having faults in a chain reaction due to excess load being applied thereto, the correction coefficients x for the charging units (CHG1 to CHG3, and CHG7 to CHG9) are set back to 1, and the user is notified of the charging power being set to 20 kW through the I/F portion 8. Then, as in First Example, the charging units (CHG1 to CHG3, and CHG7 to CHG9) that constitute first and third charging unit groups 4-1 and 4-3 perform charging at a lower power value (20 kW) than at the rated power value (30 kW).

Third Example

In this example, even when a charging unit (CHG5) transmits charging unit status data indicative of a fault, the control unit 5 does not stop charging units (CHG4 to CHG6) from outputting power, so that battery charging continues.

Note that in the present example, it is assumed that the charging unit (CHG5) transmits charging unit status data indicating that power can only be outputted at half the power value that can be outputted.

To keep the output power of the charging unit (CHG5) at half or less than half the power value that can be outputted, the control unit 5 creates command data for changing the correction coefficient x for the charging unit (CHG5) from 1 to 0.5, and transmits the command data to the charging unit (CHG5).

Here, if the correction coefficient x for the charging unit (CHG5) is changed solely, there might be variations in output power among the charging units (CHG4 to CHG6) that constitute second charging unit group 4-2, and therefore, to reduce the output power values of the charging units (CHG4 and CHG6) at the same rate as the charging unit (CHG5), the control unit 5 creates command data for changing the correction coefficients x for the charging units (CHG4 and CHG6) from 1 to 0.5, and transmits the command data to the charging units (CHG4 and CHG6).

As a result, a proper output power balance is maintained among the charging units (CHG4 to CHG6) that constitute second charging unit group 4-2, so that the output power of second charging unit group 4-2 results in 10 kW×0.5=5 kW.

Furthermore, to maintain the rated power value (30 kW) for charging power, the control unit 5 creates command data for changing the correction coefficients x for the charging units (CHG1 to CHG3, and CHG7 to CHG9) that constitute first and third charging unit groups 4-1 and 4-3 from 1 to 1.25, and transmits the command data to the charging units (CHG1 to CHG3, and CHG7 to CHG9).

Figure 6:
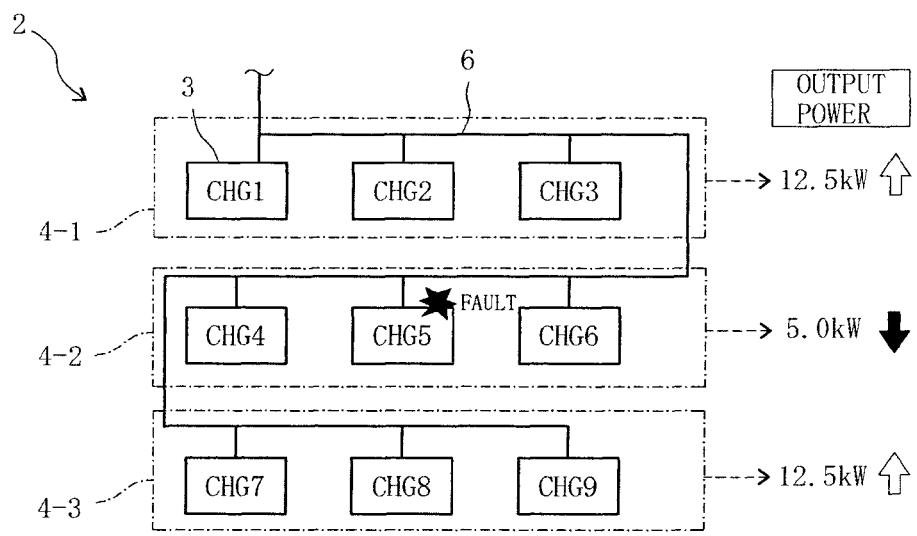
FIG. 6 is a block diagram of a power unit in Third Example of the present invention.
Figure 7:
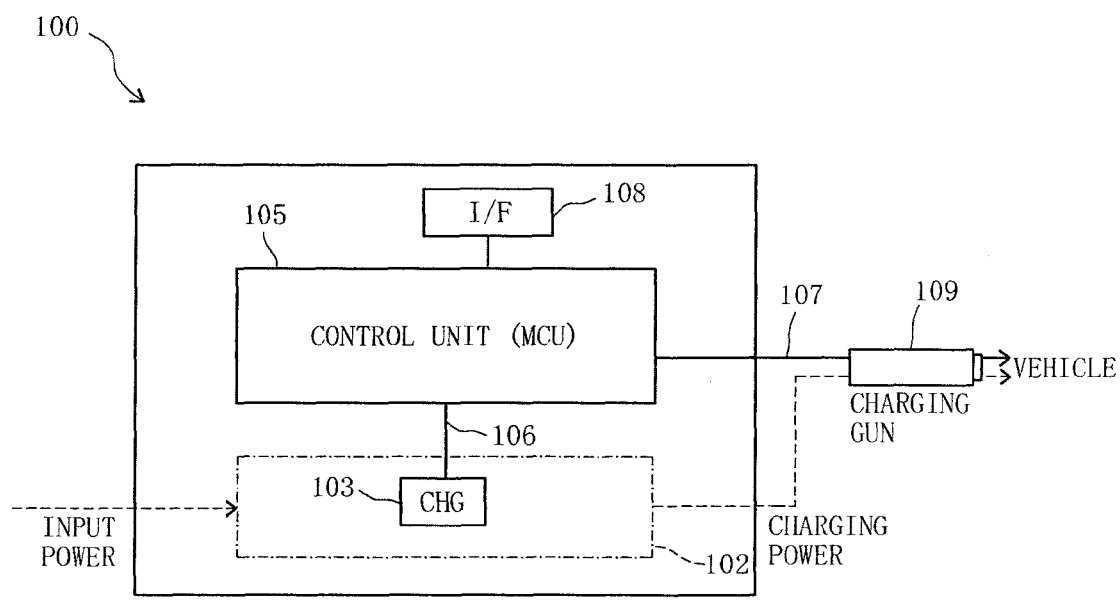
FIG. 7 is a block diagram of a conventional stationary charging system.

Accordingly, the output power of each of first and third charging unit groups 4-1 and 4-3 results in 10 kW×1.25=12.5 kW, so that the rated power value (5 kW+12.5 kW+12.5 kW=30 kW) for charging power is maintained, and therefore, battery charging can be continued (see FIG. 6).

Note that at the subsequent charging, to prevent the charging units (CHG1 to CHG3, and CHG7 to CHG9) from having faults in a chain reaction due to excess load being applied thereto, the correction coefficients x for the charging units (CHG1 to CHG3, and CHG7 to CHG9) are set back to 1, and the user is notified of the charging power being set to 20 kW through the I/F portion 8. In addition, as in First Example, the charging units (CHG1 to CHG3, and CHG7 to CHG9) that constitute first and third charging unit groups 4-1 and 4-3 perform charging at a lower power value (10 kW×1+10 kW×0+10 kW×1=20 kW) than at the rated power value (30 kW).

While the stationary charging system according to the present invention has been described above with respect to its preferred embodiment and examples, the present invention is not limited to the embodiment and First through Third Examples above.

In Third Example, the correction coefficient x for second charging unit group 4-2 is changed to 0.5, and the correction coefficients x for first and third charging unit groups 4-1 and 4-3 are changed to 1.25, but the correction coefficients x can be changed to arbitrary values.

For example, if the command value for output current is within the range of current values that can be outputted by the charging unit (CHG5), and variance (waviness) in charging power is within a predetermined range, the correction coefficient x for second charging unit group 4-2 can be caused to approximate to 1.

Furthermore, the possibility that any fault might be worsened can be reduced by further increasing the correction coefficients x for first and third charging unit groups 4-1 and 4-3 in accordance with the maximum output power of the charging units (CHG1 to CHG3, and CHG7 to CHG9), and reducing the correction coefficient x for second charging unit group 4-2.

Furthermore, in the above embodiment, the power unit 2 consists of the nine charging units 3, but the number of charging units 3 can be changed arbitrarily in accordance with required charging power.

Note that in the case where three-phase alternating-current power is used as input power, the number of charging unit groups (4-1 to 4-$n$ (where n=3m, and m=1, 2, . . . )) is preferably a multiple of 3.

Furthermore, in the embodiment, the nine charging units 3 that constitute the power unit 2 are divided into first charging unit group 4-1 consisting of charging units CHG1 to CHG3, second charging unit group 4-2 consisting of charging units CHG4 to CHG6, and third charging unit group 4-3 consisting of charging units CHG7 to CHG9, but since the charging units 3 are connected in parallel via the first CAN communication line 6, each charging unit group can be made up of any three charging units 3.

Furthermore, in the above embodiment, the control unit 5 creates command data for command values of output current to be provided by the charging units 3, and transmits the command data to the charging units 3, but instead of this, the control unit 5 may create and transmit command data for required current values and correction coefficients x for the charging units 3.

DESCRIPTION OF THE REFERENCE CHARACTERS 1 stationary charging system
2 power unit
3 charging unit
4-1, 4-2, 4-3 charging unit group
5 control unit
6 first CAN communication line
7 second CAN communication line
8 I/F portion
9 charging gun
10 rectifying and smoothing circuit
11 DC/DC converter circuit
12 inverter circuit
12a to 12d switching means
13 boost circuit (transformer)
14 output circuit
15 control circuit
15a fault diagnosis portion
16 diode bridge circuit
17 smoothing capacitor
18 diode bridge circuit
19 coil
20 smoothing capacitor
21 shunt resistance
22 current detection circuit
23 voltage detection circuit

The invention claimed is:

1. A stationary charging system for charging a battery mounted in a vehicle with direct-current charging power generated from alternating-current input power, comprising:
a power unit for generating the direct-current charging power from the alternating-current input power;
a plurality of charging units that constitute the power unit;
a control unit for controlling the charging units; and
a CAN communication line for allowing data exchange between the control unit and the charging units, wherein,
the direct-current charging power is a sum of output power provided by the charging units,
the charging units conduct fault diagnosis on themselves to create charging unit status data concerning results of the fault diagnosis, and transmit the charging unit status data to the control unit, and
the control unit classifies the charging units into a plurality of charging unit groups, and changes output statuses of the charging units for each of the charging unit groups upon reception of the charging unit status data indicative of a fault.

2. The stationary charging system according to claim 1, wherein,
the alternating-current input power is three-phase alternating-current power, and
the charging unit groups each consist of any three of the charging units to which an arbitrary one of the three phases of the alternating-current power is inputted.

3. The stationary charging system according to claim 1, wherein,
when the charging unit status data indicative of a fault is transmitted, the control unit stops the charging units that constitute the charging unit group including the charging unit diagnosed with the fault, as well as the charging units that constitute the other charging unit groups, thereby stopping battery charging, and
the control unit causes the charging units that constitute the other charging unit groups to perform the subsequent charging.

4. The stationary charging system according to claim 1, wherein, when the charging unit status data indicative of a fault is transmitted, the control unit stops the charging units that constitute the charging unit group including the charging unit diagnosed with the fault, and increases output power of the charging units that constitute the other charging unit groups in order to maintain a rated power value for the direct-current charging power, thereby continuing battery charging.

5. The stationary charging system according to claim 1, wherein, when the charging unit status data indicative of a fault is transmitted, the control unit reduces output power of the charging units that constitute the charging unit group including the charging unit diagnosed with the fault, at the same rate, and increases output power of the charging units that constitute the other charging unit groups in order to maintain a rated power value for the direct-current charging power, thereby continuing battery charging.

6. The stationary charging system according to claim 4, wherein the control unit causes the charging units that constitute the other charging unit groups to perform the subsequent charging at a lower power value than at the rated power value.

7. The stationary charging system according to claim 1, wherein,
the charging unit receives command data transmitted from the control unit and conducts the fault diagnosis, and
the control unit transmits the command data to at least one of the charging unit groups and the rest of the charging unit groups at different times, so that the charging unit status data is received at varying times.

* * * * *